Figure 1:
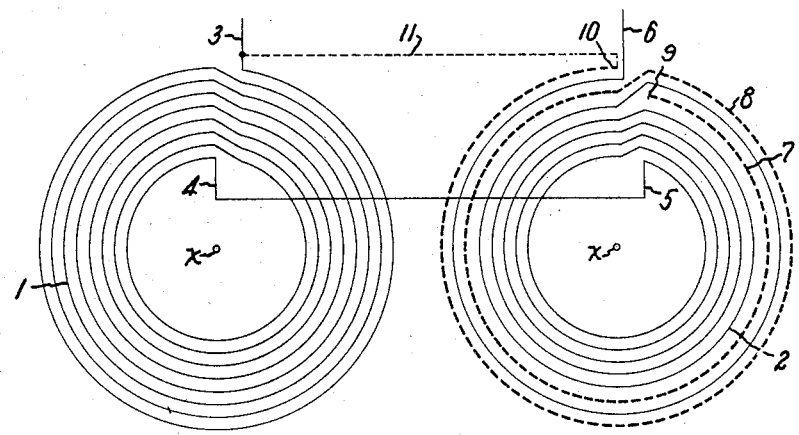

Feb. 17, 1959     M. CHRISTOFFEL ET AL     2,874,359

HIGH VOLTAGE TRANSFORMER WINDINGS WITH VOLTAGE CONTROL

Filed March 29, 1956

INVENTORS
Martin Christoffel
Anton Edlinger
BY Pierce, Scheffler & Parker.
ATTORNEYS United States Patent Office 2,874,359
Patented Feb. 17, 1959

2,874,359

HIGH VOLTAGE TRANSFORMER WINDINGS WITH VOLTAGE CONTROL

Martin Christoffel, Zurich, and Anton Edlinger, Wettingen, Switzerland, assignors to Aktiengesellschaft Brown, Boveri & Cie, Baden, Switzerland, a joint-stock company Application March 29, 1956, Serial No. 574,695

Claims priority, application Switzerland April 2, 1955

6 Claims. (Cl. 336—70)

This invention relates to windings of electrical induction apparatus and in particular to high voltage windings for transformers and the like wherein protection is desired to prevent damage in the event that the windings are subjected to surge voltages having steep wave fronts.

High voltage windings for transformers and the like are generally required to have a high dielectric strength characteristic with respect to insulation between coils in order to prevent a breakdown upon application of a surge voltage having a steep wave front, the strength of the insulation being dependent upon the capacitative ratios. Generally, it has been shown that the dielectric strength required for the winding decreases upon an increase in the ratio between the winding and earth capacity thereby providing a voltage distribution along the winding which is more linear. However, such condition is not generally present so that special means are required for influencing and improving the voltage distribution and capacitative ratios.

It is known to provide arrangements which lie outside of the winding in the main insulation, such as protective shields, rings and linings to obtain a more satisfactory distribution of any surge voltage along the winding. Such measures, however, unavoidably results in a considerable increase in the overall size of the main insulation and complicate its manufacture because of the necessity for inserting the rings, shields, linings, etc. Moreover, if the construction is not executed in a most careful manner the insulation may be weakened instead of strengthened.

As an alternative to use of rings, shields or linings it has also been proposed to utilize the windings themselves for capacity voltage control. In accordance with such proposals, windings which are electrically not connected in series and in which, by means of additional connections within the winding, the initial and final turns of a dividing coil are capacitatively coupled over junction windings, are parallel wound. Thereby the capacity effect between the turns increases thus improving the voltage distribution characteristic of the main winding. Such an arrangement suffers from the disadvantage that connections within the winding itself must be made thus complicating manufacture.

In accordance with present invention, the above noted disadvantage is avoided and the winding for power transmission may be made up generally in the usual manner, there being an auxiliary winding for controlling the potential of said power transmission winding wound simultaneously with and on and between the turns of the power transmission winding and connected only at a lead-in terminal of the power transmission winding which is easily accessible since it is exposed. The opposite end of the potential distribution winding is "free" and may terminate within the interior of the power transmission winding and is insulated from the latter. Moreover, the potential distribution winding is wound besides turns of the power transmission winding which show, as compared with the beginning, a potential difference greater than the voltage induced in a single turn. With this type of controlled potential distribution for the power transmission winding it is possible therefore, to connect adjacent coil sections of the power transmission winding directly in series. Consequently, manufacture of a potential controlled power transmission winding in accordance with the present invention is but little more complex than manufacture of a power transmission winding without control of the voltage distribution. Moreover, the present invention affords an additional advantage in that it is possible to move the potential control windings to any place suited electrically or for their manufacture.

An additional advantage obtains if the potential control winding is arranged principally in the vicinity of the entrance to the power transmisison winding and is gradually reduced in effect along the winding. A gradual reduction of the capacitative action is thereby obtained and only a very small part of the entire power transmission winding is required to be equipped with the potential control winding. If the power transmission winding is constituted by a series of disk or "pancake" type coils superposed in coaxial, concentric relation and connected in series, it is advantageous to place the potential control winding on the coil which next follows the coil to which the terminal end of the power transmission winding is conencted. Consequently, the potential control winding may be connected to the terminal end of the power transmission winding with the shortest possible lead. The potential control winding may consist of a plurality of turns each of which lies adjacent a turn of the power transmission winding, in order to provide a greater capacity. In order to insulate the free end of the potential control winding it is advantageous to carry such end to the exterior of the pancake coil of the power transmission winding with which it is associated.

The necessary insulation of the free end of the potential control winding may also be effected by returning such end to the vicinity of a turn of the power transmission winding having a smaller potential difference than the turn associated with the main portion of the potential control winding. It then becomes sufficient if the free end of the latter is insulated only for the smaller potential difference pertaining to that particular turn.

The foregoing as well as other objects and advantages of the invention will become more apparent from the following detailed description and drawings of two practical embodiments thereof as applied to a high voltage winding comprised of a plurality of coaxial, concentric superposed disk type coil sections connected in series.

Figure 2:
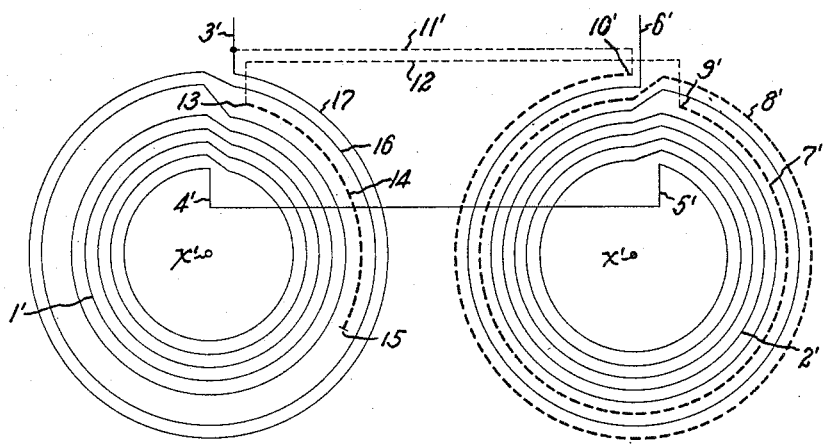

In the drawings, Fig. 1 illustrates schematically an embodiment wherein the potential control winding is applied to one of the disk coil sections; and Fig. 2 shows a modified embodiment wherein the voltage control winding is applied to two adjacent disc coil sections.

With reference now to Fig. 1, only a portion of the high voltage power transmission winding is illustrated and the portion so illustrated consists of two disc or "pancake" coil sections 1 and 2 connected in series. These sections are spirally wound and arranged coaxially in superposed relation along the axis $x$. However, for better illustration of the arrangement of the potential control winding and its connection to the power transmission coils, the two coil sections 1 and 2 have been shown in side-by-side relation. The outer terminal end of coil section 1 is indicated by numeral 3. The inner terminal end of coil section 1, indicated by numeral 4, is connected to the inner terminal end 5 of coil section 2 and the outer terminal end of coil section 2 is indicated by numeral 6. The potential control winding in accordance with the present invention, is seen to comprise a spiral winding of two turns 7 and 8 concentric with axis $x$ and located at the inner and outer sides, respectively of the outermost turn of the power transmission coil section 2. One end 9 of the potential control winding terminates within the coil section 2 and the other end 10 is connected by a very short lead 11 to the outer end terminal 3 of coil section 1.

In the modified construction according to Fig. 2 which is likewise schematically illustrated with the two coil sections of the power transmission winding in side-by-side relation, the same numerals but with primes added have been used for designating elements which correspond to those in Fig. 1. According to this embodiment, the end 9' of turn 7' of the potential control winding does not terminate within the disk coil 2' but rather is connected via a lead 12 to one end 13 a further element of the potential control winding and which consists of a partial turn 14 having its opposite end 15 "free" from any electrical connection and suitably insulated from the turns of winding 1'. The partial turn 14 lies adjacent a turn 16 of coil 1' having only a small potential difference as compared to the outermost turn 17 of this same coil 1' to which the other end of the whole potential control winding is connected via lead 11'.

In conclusion, it is to be understood that while specific embodiments of the invention have been illustrated, various modifications and arrangements and construction of parts may be made without, however, departing from the spirit and scope of the invention as defined in the appended claims.

We claim:
1. A high voltage power transmission winding comprising a plurality of disc type coils arranged coaxially in superposed relation, an auxiliary winding on one of said coils for potential control, the turns of said auxiliary winding being located between the turns of said disc coil, one end of said auxiliary winding being non-connected and insulated from the coil with which it is associated and the opposite end of said auxiliary winding being electrically connected to the end of another of said disc type coils.

2. A high voltage power transmission winding as defined in claim 1 wherein the non-connected end of said auxiliary winding terminates within the coil with which it is associated.

3. A high voltage power transmission winding as defined in claim 1 wherein the non-connected end of said auxiliary winding is brought to the outside of the coil with which it is associated.

4. A high voltage power transmission winding as defined in claim 1 wherein the power transmission disc coil to which said auxiliary winding is connected does not include any component of said auxiliary winding.

5. A high voltage power transmission winding comprising a plurality of disc type coils arranged coaxially in superposed relation, a first auxiliary winding on a first one of said disc coils at the high voltage end of said power transmission winding for potential control, the turns of said first auxiliary winding being located between the turns of said first disc coil, one end of said first auxiliary winding being connected to the end of a second disc coil arranged adjacent said first coil, the opposite end of said first auxiliary winding being connected to one end of a second auxiliary winding on said second disc coil for potential control and arranged between the turns of said second disc coil, and the opposite end of said second auxiliary winding being non-connected and insulated from said disc coils.

6. A high voltage power transmission winding for transformers comprising a plurality of disc type coils arranged coaxially in superposed relation, and an auxiliary winding on said power transmission winding for controlling the potential distribution thereof, the turns of said auxiliary winding being located principally between the turns of those disc type coils which are closest to the high voltage lead-in to the power transmission winding, one end only of said auxiliary winding being electrically connected to said high voltage lead-in and the other end of said auxiliary winding being insulated from said power transmission winding.

References Cited in the file of this patent
UNITED STATES PATENTS

| | | |
|---|---|---|
| 2,217,442 | Hendricks | Oct. 8, 1940 |
| 2,412,609 | Ganz | Dec. 17, 1946 |
| 2,692,372 | Goldstine | Oct. 19, 1954 |